United States Patent
Hurrell et al.

(10) Patent No.: US 6,778,317 B1
(45) Date of Patent: Aug. 17, 2004

(54) OPTICAL FIBER QUADRATURE DEMODULATOR

(75) Inventors: John P Hurrell, Palos Verdes, CA (US); David A. Kozlowski, Redondo Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 10/369,389

(22) Filed: Feb. 19, 2003

(51) Int. Cl.[7] ............................................... G02F 2/00
(52) U.S. Cl. .................................................. 359/325
(58) Field of Search ................................. 359/325–332

(56) References Cited

U.S. PATENT DOCUMENTS 3,694,656 A * 9/1972 Henning ..................... 359/325
5,039,951 A * 8/1991 Cheung et al. ............. 329/302
5,349,465 A * 9/1994 Mizuno ...................... 359/325

FOREIGN PATENT DOCUMENTS

| EP | 0 363 226 A2 | * 4/1990 | ............ H03D/1/22 |
| WO | WO 99/66687 | * 12/1999 | ............ H04L/27/22 |

* cited by examiner

Primary Examiner—John D. Lee
(74) Attorney, Agent, or Firm—Derrick Michael Reid

(57) ABSTRACT

An optical fiber quadrature demodulator, for use in optical receivers, has an optical local oscillator for providing a coherent pilot tone that is mixed with an optical input signal to provide a piloted optical input signal. The pilot tone tracks phase shifts through the optical fibers for tracking the phase shift to the optical input signal as a phase shift reference in the demodulator providing coherent signal demodulation. The demodulator maintains optical phase coherence between the physically separated I and Q optical channels in the presence of unknown and time varying phase perturbations that occur in optical fibers used in photonic processing and communication systems.

13 Claims, 2 Drawing Sheets

OPTICAL FIBER QUADRATURE DEMODULATOR

OPTICAL FIBER QUADRATURE DEMODULATOR

SHORT WAVELENGTH RF SIGNAL

LONG WAVELENGTH RF SIGNAL

OPTICAL FIBER QUADRATURE DEMODULATOR

STATEMENT OF GOVERNMENT INTEREST

The invention was made with Government support under contract No. F04701-00-C-0009 by the Department of the Air Force. The Government has certain rights in the invention.

FIELD OF THE INVENTION

The invention relates to the field of optical fiber communications. More particularly, the present invention relates to the demodulation of optical signals in quadrature for photonic processing and optical data communications.

BACKGROUND OF THE INVENTION

Quadrature demodulators are used to separate quadrature mixed product signals typically generated during quadrature modulation, using a local oscillator. Quadrature demodulators are also used for separating signals having frequencies above or below the local oscillator reference. The mixing of the signals is usually performed by a pair of modulators modulating a local oscillator signal in quadrature for producing the mixed product signals in quadrature. The mixed product signals have respective frequencies that are typically and equally above and below the oscillator frequency of the local oscillator. The mixed product signals may be for example, I&Q quadrature signals having a quadrature component (Q) and an inphase component (I) for providing communications over a Q channel and an I channel. The quadrature and inphase components have a 90° phase shift offset from each other, and are used to modulate a carrier having an RF microwave frequency or an optical frequency. The electrical demodulators are readily implemented at radio frequencies (RF) and up to the microwave frequencies because the 90° phase shift between the I channel and Q channel can be accurately maintained at those frequencies. At optical frequencies, the 90° phase shifts can be generated using optical hybrids, but the phase shift preceding the optical hybrids cannot be accurately maintained over physically separated optical channels, such as optical fiber channels, that are environmentally sensitive. Optical fibers change in length, diameter and polarization over time due to temperature and stress, introducing variable performance characteristics over the operational life of the optical fiber. Optical wavelengths are very short compared to physical path lengths of interest within an optical demodulator. Consequently, small percentage changes in optical path lengths translate into large optical phase changes providing inaccurate phase shifts during optical signal demodulation. Hence, up to the present time, optical quadrature demodulators have only been considered for free space propagation that does not incur the variable optical performance associated with optical fibers.

Prior optical systems have failed to maintain optical phase coherency between physically separated optical channels that are subjected to unknown and time varying phase perturbations such as those occurring in optical fiber connected photonic processing systems. In a quadrature system, for example, imprecise fiber optical lengths inject unknown phase perturbations such that there is a lose of coherency between the I and Q optical paths, rendering physical fiber optical paths, as guided wave channels, unsuitable for coherent optical demodulation. These and other disadvantages are solved or reduced using the invention.

SUMMARY OF THE INVENTION

An object of the invention is to provide optical demodulation of an optical signal input using guided propagation in an optical quadrature demodulator.

An object of the invention is to provide optical demodulation of an optical signal input using guided propagation in an optical quadrature demodulator having close loop control for detecting phase changes within a guided media.

Yet another object of the invention is to provide optical demodulation of an optical signal input using guided propagation in an optical quadrature demodulator for detecting phase changes within a guided media and for maintaining coherent heterodyne demodulation over phase changes in guided media performance.

Still another object of the invention is to provide optical demodulation of an optical signal input using guided propagation in an optical quadrature demodulator having a pilot tone for detecting phase changes within optical fibers and for maintaining coherent homodyne demodulation over changes in optical fiber performance.

The present invention is directed to a guided propagation quadrature demodulator for preferred use in optical receivers for optical data guided communication over an optical link. Guided propagation is preferably realized by optical fibers communicating an optical input signal. The optical fibers have variable phase changes over time. Close loop control maintains coherent demodulation so that the demodulator is effectively insensitive to the variable phase changes of the optical fibers. An optical local oscillator (OLO) is used to provide a large OLO signal and a small pilot tone.

The I and Q pilot signals are used as I and Q input signals during homodyne demodulation. During homodyne demodulation, a pilot tone from the OLO is routed through I and Q channel input optical fibers and then mixed with the large OLO signal also from the OLO for also producing the error component for close loop control. In homodyne demodulation, the error component in the RF domain is used to generate an error signal for phase modulating the OLO signal for coherent demodulation.

The OLO provides an I OLO signal and a 90° phase shifted Q OLO signal that are respectively I and Q phased shifted respectively by I and Q phase shifters, and then respectively mixed with the I and Q piloted optical input signals, using homodyne detection, to provide RF quadrature and RF inphase output signals. Optical balanced detectors mix the phase modulated I and Q OLO signal with the I & Q input signal for providing the I and Q error components in the RF domain. An RF local oscillator provides f and 2f frequency references to respective phase sensitive detectors for respectively generating I and Q phase errors between the OLO and the pilot tone or input signal. The I and Q phase errors are respectively added by phase summers to the f and 2f references for providing respective I and Q frequency error signals. The I and Q frequency error signals in I and Q parallel and independent closed loops control the phase modulation of the I and Q OLO signals for coherently aligning the I and Q OLO signals to the I an Q pilot signal or input signals for respective accurate coherent homodyne or heterodyne demodulation.

During either homodyne or heterodyne signal demodulation, the OLO signal is communicated in quadrature with the modulator having a quadrature (Q) channel and an inphase (I) channel, each of which having a phase modulated OLO signal that is mixed for coherent detection of an input signal. During heterodyne demodulation, an optical input signal is routed through I and Q channel fibers for mixing with the large OLO signal for generating an error component for close loop control of the phase modulation of the I and Q OLO signal during coherent demodulation.

As the I and Q channel optical fibers communicate the pilot tone or input signals, the optical fiber performance characteristics over time result in the injecting of unwanted variable phase shifts. These unwanted phase shifts are detected for coherent aligning the I and Q OLO with the I and Q input signal for coherent demodulation. The demodulator advantageously and accurately maintains coherent demodulation of I and Q input signals such that the I and Q RF output signals do not degrade with the changing optical fiber performance user closed loop control. Hence, optical phase coherence is maintained between the physically separated I an Q optical fibers, that are subjected to unknown and time varying phase perturbations, such as those occurring in optical fibers connected to a photonic processing system.

The invention can maintain phase coherence between I and Q channels along separate optical fibers. By injecting a weak optical pilot tone into the input signal, the pilot tone and input signal are exposed to the same environmental perturbations of the optical fibers. The pilot tone signal or input signal effectively tracks the phase perturbation within the optical fiber. The input signal or pilot tone in the I channel and Q channel tracks the phase shifts, as a phase modulated OLO is mixed with the pilot tone for coherent detection. The OLO phase shift with respect to the pilot signal or input signal is controlled by the RF frequency error signal that is proportional to the phase offset generated from phase-balanced detection. The I and Q channels have separate closed loops for separate tracking of the phase shifts along the I and Q channel optical fibers. The phase difference between the input signal in two optical fibers and the OLO is separately tracked by respective close loops. The frequency error signals are generated by phase detection of the error component and the reference. Phase modulation of the OLO signal under closed loop control maintains coherent demodulation in both channels. The I channel balanced detection produces the I channel error component at the RF modulation frequency as the Q channel balanced detection produces the Q channel error component at twice the RF modulation frequency. The I channel frequency error signal is generated at the RF modulation frequency and the Q channel frequency error signal is generated at twice the modulation frequency and in quadrature to the I channel. Hence, the closed loop control generates an error signal in the RF domain for optical phase modulation of the OLO signal for coherent demodulation of the I and Q input signals. The I and Q channels do not suffer the same time delay through the respective I and Q optical fibers before the input signal and OLO are mixed together. Thus, two I and Q channel closed loop controls function independently and serve track the phase perturbations through the I and Q channel optical fibers for accurate heterodyne or homodyne demodulation. These and other advantages will become more apparent from the following detailed description of the preferred embodiment.

DETAILED DESCRIPTION OF THE PREFERRED EMBODIMENT

Figure 1:
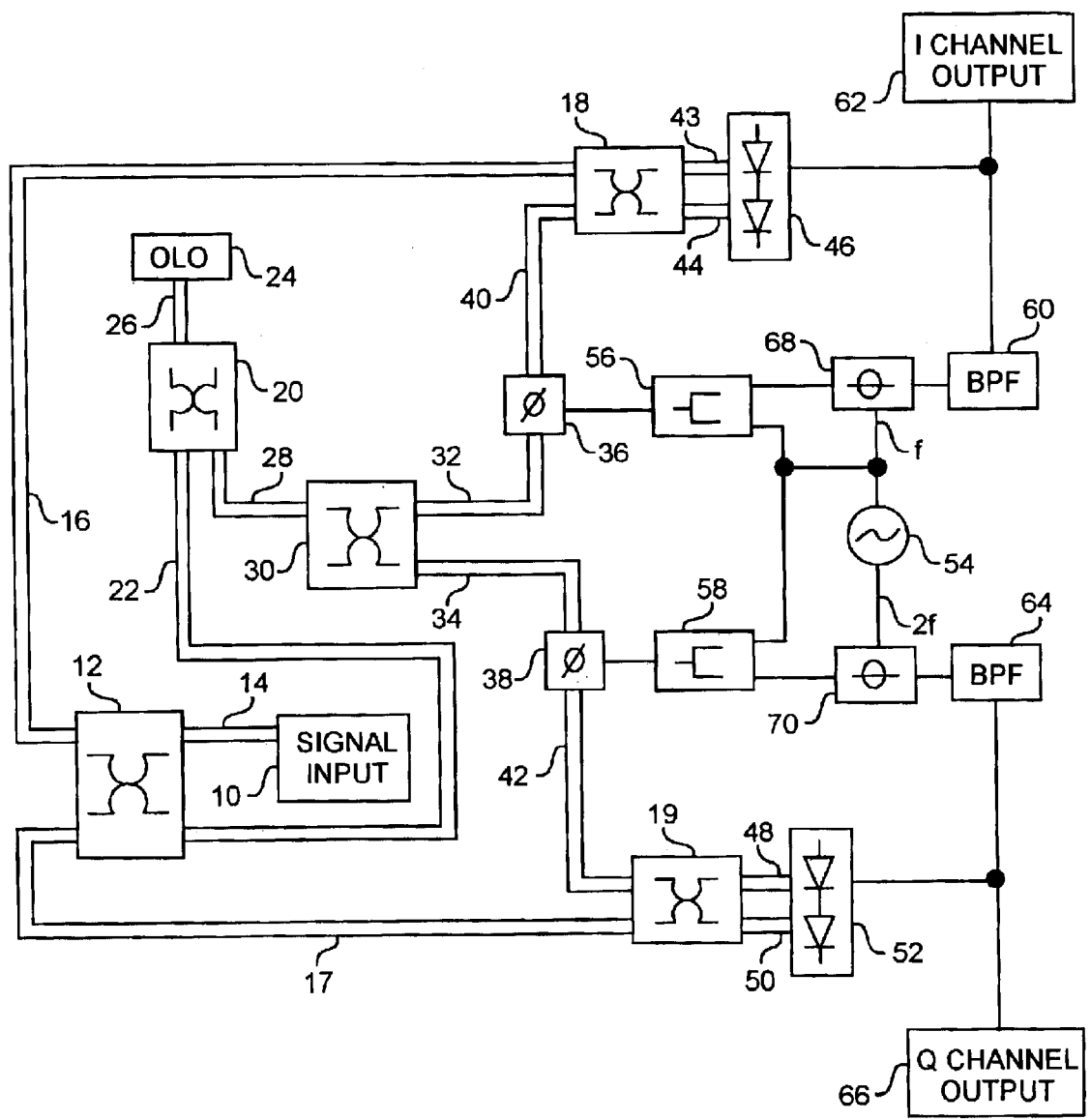
FIG. 1 is a schematic of an optical fiber quadrature demodulator.

An embodiment of the invention is described with reference to the figures using reference designations as shown in the figures, with double lines indicating guided optical media paths, such as the preferred optical fibers, and single lines indicating electrical paths. Referring to FIG. 1, an optical input signal 10 is fed into an input 90° optical hybrid 12 through an input optical path 14. The input 90° optical hybrid 12 has an inphase (I) optical path 16 and a quadrature (Q) optical path 17 connected to respective I and Q 90° optical hybrids 18 and 19, respectively. The optical paths 16 and 17 are preferably optical fibers. An optical coupler 20, is connected to a pilot optical path 22 for communicating a pilot tone to the input hybrid 12. The pilot tone is a small optical signal originating from an optical local oscillator (OLO) 24 communicating an optical local oscillator signal through an OLO path 26 to the coupler 20.

Large, equal amplitude and phase shifted I and Q channel OLO signals are communicated to the two separate I and Q channel hybrids 18 and 19. The OLO signal is split into a small and large OLO signals by the optical coupler 20 that communicates the small OLO pilot tone along the pilot optical path 22 to the input hybrid 12, and communicates the large OLO through a large OLO path 28 to a large OLO 90° optical hybrid 30, that is also an optical coupler. The large OLO 90° optical hybrid 30 provides and communicates an I channel large OLO signal through an I channel OLO path 32 to an I channel phase shifter 36, and provides and communicates a Q channel OLO signal through a Q channel large OLO signal path 34 to a Q channel phase shifter 38. The I and Q phase shifters 36 and 38 respectively provide the large, equal amplitude and phase shifted I and Q OLO signals respectively through I and Q channel phase shifted paths 40 and 42 to the respective I and Q channel hybrids 18 and 19. As such, there are I and Q input optical paths 16 and 17 respectively communicating the I and Q channel input signals that are subject to variable phase perturbations from the paths 16 and 17, and, there are two phase shifted large OLO signals that are mixed with the I and Q input signals by the optical hybrids 18 and 19. As such, the demodulator has front end photonic processing. The front end photonic processing is followed by back end RF closed loop control.

The RF closed loop control is used for tracking in the RF domain unknown optical phase perturbations experienced by the I and Q channel input signals during respective propagation through the I and Q input optical paths 16 and 17. The I and Q channel input signals are demodulated using optical balanced detection. The hybrid 18 splits the I channel input signal through parallel I bifurcation optical fibers 43 and 44 for communicating the I channel coupled signals to an I channel optical balanced detector 46. The hybrid 19 splits the Q input signal through parallel Q bifurcation optical fibers 48 and 50 to a Q optical balanced detector 52. Each pair of bifurcated input signals are respectively fed into the optical balanced detectors 46 and 52, each of which includes two matched photodiodes for optical balanced detection.

An RF local oscillator (RFLO) 54 provides an f and 2f frequency reference for back end electronic RF closed loop control. The f frequency reference is fed into an I channel summer 56 and a Q channel summer 58 for respectively providing I and Q channel frequency error signals to the I and Q phase shifters 36 and 38. The balanced detectors 46 and 52 provide respective I and Q channel outputs 62 and 66 that are also fed through I and Q channel bandpass filters 60 and 64 providing I and Q filtered output signals to respective I and Q channel phase detectors 68 and 70. The I and Q channel outputs 62 and 66 have optical mixing products created at the outputs of the balanced detectors 46 and 52. One product is an error component. The I channel balanced detector 46 generates an f error component at the f frequency reference with the I channel input signal in path 16 that is out of phase with the I channel phase shifted OLO signal in path 40. The Q channel balanced detector 52 generates a 2f error component at the 2f frequency reference when the Q channel input signal in path 17 is out of ninety degree phase with the Q channel phase shifted OLO signal in path 42. The f error component is passed by the filter 60 and the 2f error component is passed by the filter 64. The bandpass filters 60 and 64 pass RF signals in the RF domain and are centered about the f and 2f frequency references for passing the f and 2f error components respectively.

The I channel phase detector 68 receives the passed f error component and receives the f frequency reference from RFLO 54 for providing an I channel phase error signal to the I channel summer 56. The Q channel phase detector 70 receives the passed 2f error component and receives the 2f frequency reference from RFLO 54 for providing a Q channel phase error signal to the Q channel summer 58. The I and Q channel phase error signals are DC signals that indicate the amount of phase error. The I and Q channel phase error signals are respectively added to the f and 2f frequency references by the I and Q channel summers 56 and 58 for respectively providing I and Q channel frequency error signals that are respectively fed to the I and Q channel phase shifters 36 and 38 for respectively phase shifting the I and Q channel OLO signals into the I and Q phase shifted OLO signal communicated in paths 40 and 42. Hence, the f and 2f error components from the balanced detectors 46 and 52 are used under closed loop control to phase shift the OLO signal prior to mixing in the balanced detectors 46 and 52 for coherent phase alignment within the I and Q channel input signals that may experience phase perturbations in paths 16 and 17.

During homodyne and hetrodyne signal demodulation, the large OLO signal and the pilot signal are derived from the common OLO 24. In both cases, the OLO signals are phase shifted under RF closed loop control for maintaining phase coherency with I and Q input signals in paths 16 and 17. The error components passed to the phase shifters 36 and 38 are derived from the output signals 62 and 66 of balanced detectors 46 and 52 after band pass filtering and phase detection. The phase detectors 68 and 70 provide the f and 2f error components as closed loop feedback signals used to control the phase shifting of phase shifters 36 and 38. The phase shifters 36 and 38 respectively receive the f and 2f error components that are low frequency drive signals, derived from the RFLO 54, in the RF domain. The RFLO 54 provides the inphase f frequency reference and the quadrature 2f frequency reference that is a second harmonic 2f frequency reference signal. The f and 2f frequency references are fed to the two RF phase sensitive detectors 68 and 70, respectively, for generating the I and Q phase error signals. The phase error signals are DC phase error signals that are summed by summers 56 and 58 with the f and 2f frequency references for providing the I and Q channel frequency error signals that are used as modulation drive signals fed to the phase shifters 36 and 38. The I channel frequency error signal and the Q Channel frequency error signal are both f frequency drive signals generated from respective I and Q phase error signals. The I phase error signal is found using phase detection between an f error component and the f frequency reference while the Q phase error signal is found using phase detection between a 2f error component and the 2f frequency reference, even though the I and Q frequency error signal are both f frequency modulation drive signals.

Each large OLO signal is passed through the phase shifters 36 and 48 that function as optical phase modulators, for phase modulating the OLO signals as phase shifted OLO signals before being injected into the hybrid 18 and coupler 20 along with the I and Q channel input signals. The phase shifters 36 and 38 are controlled by the RF closed loops so as to maintain either zero or 90° phase offset respectively between the I and Q large OLO signals and the I and Q channel input signal in the input paths 16 and 17. As the phase perturbation change over time in paths 16 and 17, the phase shifters 36 and 38 change large OLO signals for maintaining coherent detection under RF closed loop control.

An I channel close loop extends from the I channel detector 46 producing a f error component, through the I bandpass filter 60 passing the f error component, through the I phase detector 68 generating the I channel phase error signal, through the I channel summer 56 providing the I channel frequency error signal, through the I channel phase shifter 36 that phase shifts, that is modulates, the I channel OLO signal into the I channel phase shifted OLO signal in path 40, through the hybrid 18 and paths 43 and 44, and back to I channel balanced detector 46, for adjusting the phase shift of the I channel phase shifted OLO signal in path 40 for maintaining coherency between the I channel phase shifted OLO signal communicated through path 40 and the I channel input signal communicated through the I channel input path 16 having unknown variable phase perturbations. Likewise, a Q channel close loop extends from the Q channel detector 52 producing a 2f error component, through the I channel bandpass filter 64 passing the 2f error component, through the I phase detector 70 generating the Q channel phase error signal, through the Q channel summer 58 providing the Q channel frequency error signal, through the Q channel phase shifter 38 that phase shifts, that is modulates, the Q channel OLO signal into the Q channel phase shifted OLO signal in path 42, through the hybrid 19 and paths 48 and 50, and back to Q channel balanced detector 52, for adjusting the phase shift of the Q channel phase shifted OLO signal in path 42 for maintaining coherency between the Q channel phase shifted OLO signal communicated through path 42 and the Q channel input signal communicated through the Q channel input path 17 also having unknown variable phase perturbations. Hence, the demodulator, in the preferred form, as two independent RF closed loops for maintaining phase coherency between respective optical inputs and phase shifted OLO signals.

Figure 2:
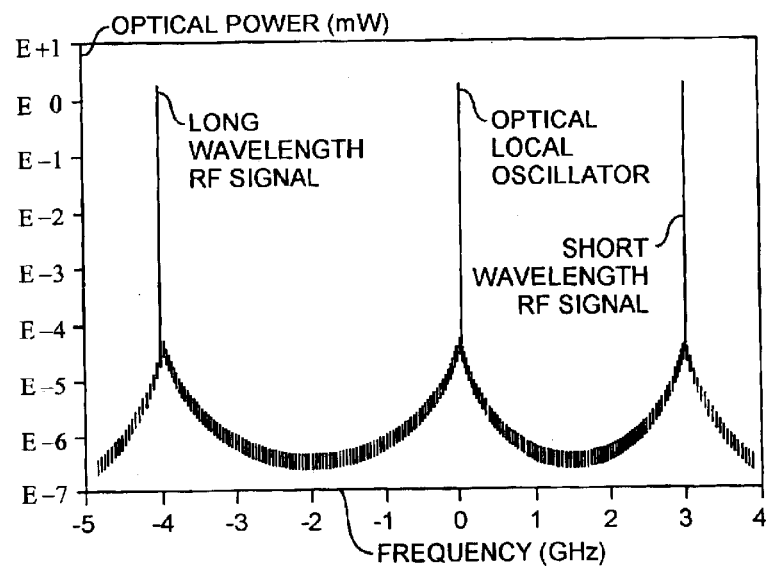
FIG. 2 is a graph of optical wavelengths
Figure 3A:
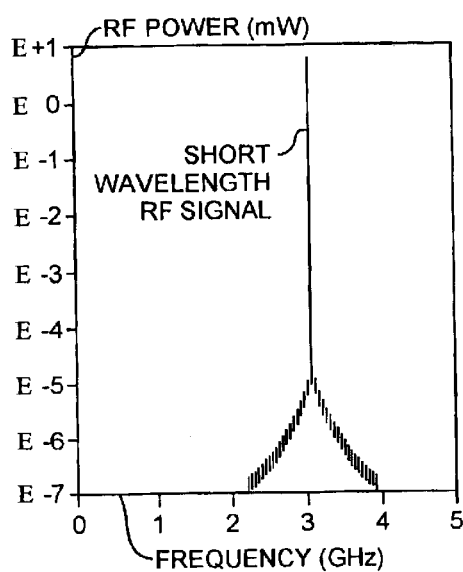
FIG. 3A is a graph of a short wavelength RP signal.
Figure 3B:
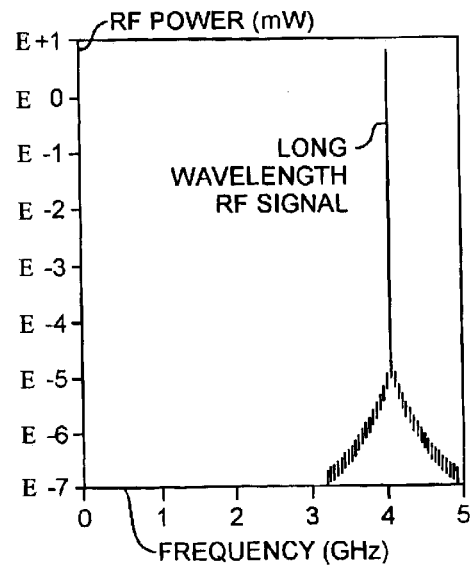
FIG. 3B is a graph of a long wavelength RF signal.

Referring to all of the Figures, and more particularly to FIGS. 2, 3A, and 3B, an optical local oscillator signal is centered at a center frequency and is positioned between long and short wavelength signals at respective lower and higher frequencies. The short and long wavelength signal can be sideband signals to an optical carrier. The arbitrary input is coupled with the pilot tone using the hybrid 12. The RF close loop control functions to maintain phase coherency with the pilot tone, and hence adjust the phase shifting over time as the fibers 16 and 17 change over time. The short and long wavelength signals are generated by the balanced detectors 46 and 52 and output as output 62 and 66 for further RF electronic processing, with the optical carrier being removed by optical demodulation. During homodyne detection for optical carrier homodyne demodulation, phase perturbations are tracked in optical fiber. The demodulator effectively isolates the short and long wavelength signals from the local oscillator signal for further RF processing while continuously tracking phase perturbations. During heterodyne demodulation, the optical input signal is fed through both input path 16 and 17. The RF close loop serves to maintain phase coherency for quadrature demodulation for producing an inphase I channel output and a quadrature Q channel output, while generating the f and 2f error components for closed loop control.

The invention is directed to the use of RF closed loop control for tracking phase perturbations in input guided optical paths, for maintaining phase coherence between I and Q channel input signals and a OLO signal, over time as phase changes occur in the input guided optical paths. Homodyne detection using a weak pilot tone can be used for demodulating an arbitrary optical input signal having an optical carrier and one or more sideband signals that are demodulated for isolating the sideband signals for further processing. The pilot tone is exposed to the environmental perturbations in the input optical paths, that is tracked by RF closed loop control for maintaining phase coherency such that phase changes over time do not effect demodulation of the input signal and the isolation of the sideband signals. The pilot signal tracks the perturbation on the input signal and provides a relative phase reference in both channels. The phase of the OLO signal, with respect to the pilot tone, is controlled by the frequency error signal that is proportional to the phase offset generated from homodyne detection of the pilot signal. There is a separate RF closed loop for each channel. There can be any number of channels, though only two channels are preferred. The OLO signal is phased shifted through phase modulation using the frequency error signal, and hence, RF signals under closed loop control are used to drive the optical phase modulation of the phase shifted OLO signal used for demodulation. For heterodyne demodulation, the input signal is an optical carrier modulation signal in quadrature and I and Q channel components. The optical carrier is demodulated for generating the I and Q signal in the RP domain. The RF close loops serve to maintain phase coherency with the demodulation optical carrier. Relative phase differences between the two orthogonal channels can be tracked using a RF modulation drive signal using a RF close loop control.

The input signals in the input optical paths may suffer from differing time delays before the input signal and OLO are mixed together. Hence, two closed loops are used for independent demodulation of the I and Q input signals. Hence, the time delay only perturbs the accuracy of the I and Q channels in proportion to the RF bandwidth and not the optical frequency. The optical demodulator can be used for demodulation of received optical signals for use in optical data communication and photonic processing systems. All the optical paths and components utilize polarization maintaining optical fiber. Arbitrary polarization can be accommodated by either conditioning the input signal to create the appropriate polarization or having a second optical fiber demodulator that provides polarization diversification. Those skilled in the art can make enhancements, improvements, and modifications to the invention, and these enhancements, improvements, and modifications may nonetheless fall within the spirit and scope of the following claims.

What is claimed is:

1. A demodulator for coherent demodulation of an optical input signal, the demodulator comprising, an optical local oscillator for providing a optical local oscillator signal, a guided media for communicating the optical input signal, the guided media having phase perturbations effecting the optical input signal, a mixer for receiving a phase shifted optical local oscillator signal and for demodulating the optical input signal into an RF output signal having an RF frequency error component, an error detector for receiving RF frequency error component and an RF frequency reference for providing a frequency error signal, and a phase shifter driven by the frequency error signal for phase shifting the local oscillator signal into the phase shifted local oscillator signal, the phase shifted local oscillator signal being coherent with the optical input signal prior to demodulating the optical input signal into the RF output signal during the phase perturbations of the optical input signal communicated through the guided media.

2. The demodulator of claim 1 wherein the mixer comprises, a hybrid for receiving the input signal and the phase shifted local oscillator signals for providing coupled signals, and a balanced detector for balanced detecting the coupled signals into the RF output signal.

3. The demodulator of claim 1 wherein the error detector comprises, a generator for providing the RF reference signal, a phase detector for receiving the RP error component and the RF reference signal for providing a phase error signal, and a summer for summing the phase error signal and the RF reference signal for generating the frequency error signal.

4. The demodulator of claim 1 wherein the error detector comprises, a generator for providing the RP reference signal, a filter for filtering the RF error component from the RF output signal, a phase detector for receiving the RF error component and the RF reference signal for providing a phase error signal, and a summer for summing the phase error signal and the RF reference signal for generating the frequency error signal.

5. The demodulator of claim 1 wherein, the guided media is an optical fiber.

6. The demodulator of claim 1 wherein, the local oscillator generates a pilot tone that is coupled with the optical input signal, and the demodulator is a homodyne demodulator using homodyne detection of the pilot tone in phase relationship to the phase shifted local oscillator signal.

7. The demodulator of claim 1 wherein, the local oscillator generates a pilot tone that is coupled with the optical input signal, the optical input signal comprises an optical carrier with a sideband signal, the demodulator is a homodyne demodulator using homodyne detection of the pilot tone in phase relationship to the phase shifted local oscillator signal, and the output signal comprises the sideband signal and the RF error component.

8. The demodulator of claim 1 wherein, the optical input signal is a quadrature optical signal modulating an optical carrier, and the demodulator serving to demodulate the quadrature optical signal into an RF quadrature signal, the RF output signal comprising the RF quadrature signal.

9. A demodulator for coherent demodulation of an optical input signal, the demodulator comprising, an optical local oscillator for providing a optical local oscillator signal, an input hybrid for splitting the optical input signal into I and Q optical inputs signals, I and Q optical fibers for receiving the respectively communicating the I and Q optical input signals, the I and Q optical fibers having respective phase perturbations respectively affecting the I and Q optical input signals, I and Q hybrids for respectively receiving the I and Q optical input signals and generated I and Q coupled signals, I and Q balanced detectors for respectively converting the I and Q coupled signals into I and Q output signals, the I and Q hybrids and the I and Q balanced detectors serving to demodulate the I and Q optical input signals into the I and Q output signals, the I and Q output signals being RF output signals, the I output signal comprising an I RF output signal and an I error component having an f frequency, the Q output signal comprising a Q RF output signal and a Q error component having a 2f frequency, I and Q phase detectors for respectively detecting I and Q phase differences as I and Q phase errors between the I and Q error components and f and 2f frequency references, I and Q summers for respectively summing the I and Q phase error signals with the f and 2f frequency references for respectively providing I and Q frequency error signals, and I and Q phase shifters respectively driven by the I and Q frequency error signals for respectively phase shifting the I and Q local oscillator signals into the I and Q phase shifted local oscillator signals, the I and Q phase shifted local oscillator signals being respectively coherent with the I and Q optical input signals prior to demodulating the I and Q optical input signals into the I and Q output signals, coherency being maintained during phase perturbations of the I and Q optical input signal communicated through the I and Q optical fibers.

10. The demodulator of claim 9 wherein, the I and Q optical input signals comprise an optical carrier modulated signal having I and Q components, and the I and Q output signals respectively comprise the I and Q components.

11. The demodulator of claim 9 further comprising, an oscillator coupler connected to the optical local oscillator for providing the optical local oscillator signal and a pilot tone signal, the pilot tone being communicated through the input hybrid and through the I and Q optical fibers, the I error component and the Q error component indicating phase coherency between the pilot tone and the phase shifted local oscillator signals, the demodulator being a homodyne demodulator, and the I and Q hybrids and the I and Q balanced detectors serving to provide homodyne detection of the pilot tone and the phase shifted local oscillator signals.

12. The demodulator of claim 11 wherein, the optical input signal comprising an optical carrier modulated by a sideband signal, the I and Q output signals comprise the sideband signal.

13. The demodulator of claim 11 wherein, the optical input signal comprises an optical carrier modulated by a first sideband signal having a long wavelength and a second sideband signal having a short wavelength, the I and Q output signals comprising the first and second sideband signals.

* * * * *